Oct. 10, 1961      G. H. PETERSON      3,004,136
WELDING, PROXIMITY EFFECT BY PHASE CONTROL
Filed Oct. 30, 1959      2 Sheets-Sheet 1
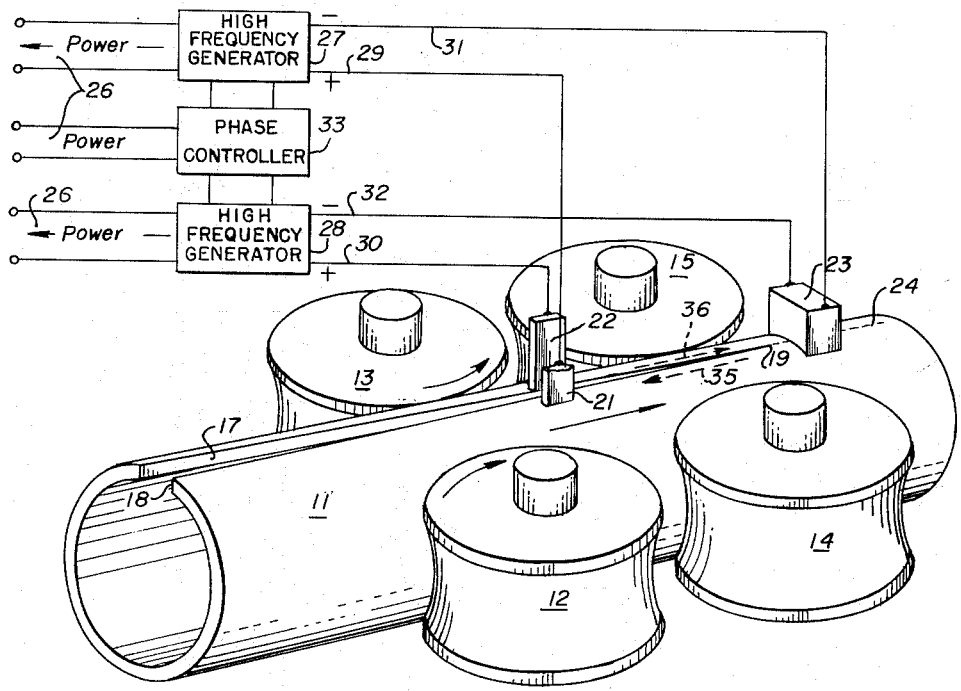
Fig. 1.
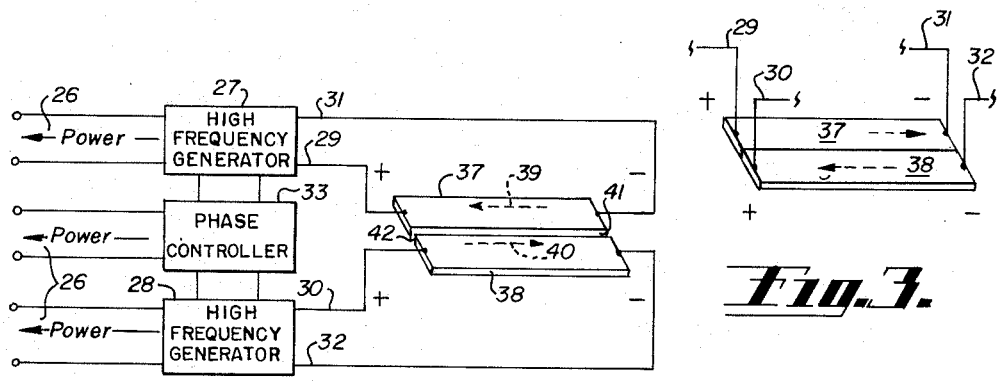
Fig. 2.
Fig. 3.
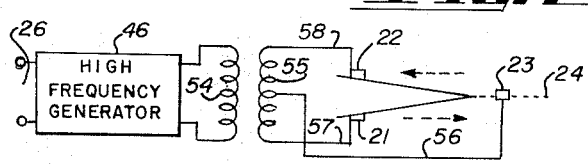
Fig. 5
INVENTOR.
GERALD H. PETERSON
BY Paul Bliven
ATTORNEY.

Oct. 10, 1961     G. H. PETERSON     3,004,136
WELDING, PROXIMITY EFFECT BY PHASE CONTROL
Filed Oct. 30, 1959     2 Sheets-Sheet 2
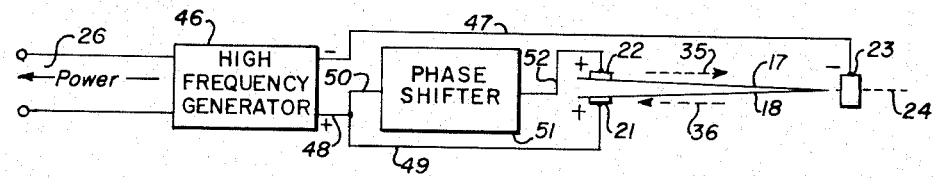
Fig. 4.
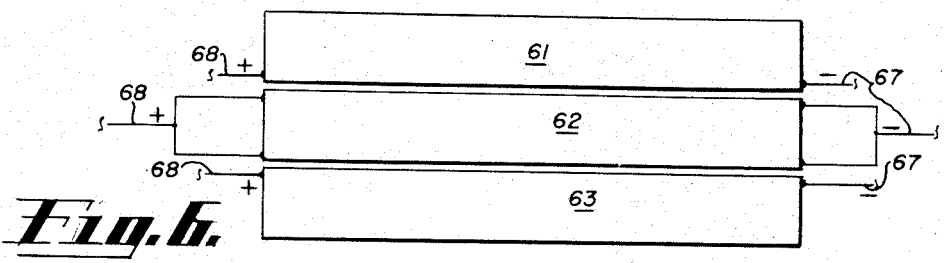
Fig. 6.
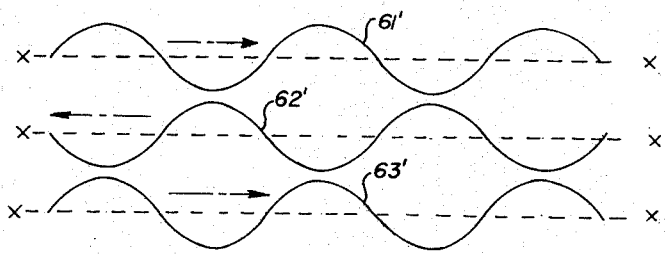
Fig. 7
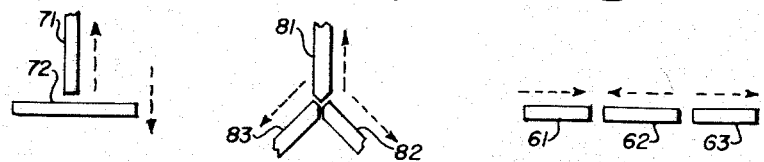
Fig. 8.    Fig. 9.    Fig. 10
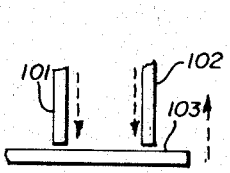 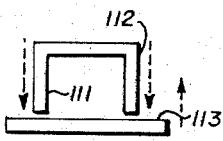 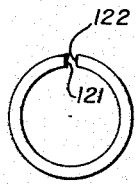
Fig. 11.    Fig. 12.    Fig. 13.
INVENTOR.
GERALD H. PETERSON
BY Paul Bliven
ATTORNEY.

3,004,136
WELDING, PROXIMITY EFFECT BY PHASE CONTROL
Gerald H. Peterson, 1001 3rd St., Santa Monica, Calif.
Filed Oct. 30, 1959, Ser. No. 849,964
22 Claims. (Cl. 219—67)

The present invention finds application particularly in the art of heating opposed metal surfaces for their welding together by contact or pressure; where such heating is resistance heating effected by means of high frequency currents which, in the present invention, are co-directional currents which flow in, or are confined to, such opposed surfaces due to the phenomenon of the proximity effect achieved by phase regulation of such currents with respect to each other.

The prior art in this field is well shown by the following citations:

(A) Bennett, 2,066,668, Jan. 5, 1937, 219–11
(B) Bennett, 2,692,322, Oct. 19, 1954, 219–6
(C) Rudd et al., 2,818,488, Dec. 31, 1957, 219–59
(D) Rudd, 2,821,619, Jan. 28, 1958, 219–107
(E) Rudd, 2,827,543, Mar. 18, 1958, 219–67
(F) Cable et al., 2,827,544, Mar. 18, 1958, 219–67
(G) Rudd et al., 2,857,503, Oct. 21, 1958, 219–59 and by a publication (H) "High-Frequency Resistance Welding," by Wallace C. Rudd; The Welding Journal, July, 1957; pub., American Welding Society, 33 W. 39th Street, N.Y. 18, N.Y.

The above patents and publications are hereinafter referred to by using the letters in parenthesis before the above citations. These prior citations provide a description and definition of the "high frequency" (H.F.), "high frequency currents" (H.F.I.), "high frequency resistance" (H.F.R.), "skin effect," "proximity effect," other terms usual in this art, and a general background of the art of H.F.R. welding, particularly as applied to the welding together of the edges of thin sections or thin section edges to various extended surfaces, or "metal plates" (D), and more particularly to welding of the seam of pipe or various metals (C), (E), (F), (G), (H). The metals to be joined may be of the same or different metals, and metals of various compositions (H).

The present invention relates to the art of resistance heating of metals by means of H.F.I. of radio frequency and includes the order of 450 kilocycles per second. The prior art discloses the use of frequencies from 10 to 500 or more kc.p.s., (D), (G), (H), and such may be used in the practice of the present invention for reasons set forth in such art. Such current is passed on (or over) the surface to be heated for welding.

Surface currents are currents which travel on or practically on the surface of a material to the exclusion of travel uniformly thru the material because such surface travel offers the path of lowest impedance between electrodes, even if such path is not the shortest between electrodes. This phenomenon of surface travel, skin effect, occurs when H.F.I. flows along a conductor. The effect becomes very noticeable above 100 kc., and its use is very effective in edge welding at about 450 kc., wave lengths of 100 to 670 meters.

The use of H.F.I. for heating the surfaces of materials is old and has found considerable application in the manufacture of welded seam tubing and pipe of many different materials (H), and in the edge welding of strips to plates (D), particularly where the joining of thin materials is desired. Probably the most satisfactory and successful of the present processes for the making of such welds involves bringing together in the form of a V the two edges of the materials to be welded with the weld occurring at the apex of the V. The edges of the V are heated by such H.F.I., and as fast as they heat and the weld is effected at the apex of the V, edges to be welded are fed to the V for heating and then to the apex for welding, (C), (E), (F), (G), (H). The edge surfaces of the V have been heated by passing the current along such surfaces.

Two methods have been used in the prior art for concentrating the current on the opposed surfaces of the legs of the V. Each method has involved the skin effect which forces H.F.I. to flow on the surface of a conductor. In addition, the first method uses the proximity effect by placing the electrodes so that current flows in one leg to the V's apex, and in the other leg from the apex. The proximity effect forces H.F.I. in adjacent conductors to flow on the adjacent surfaces to the practical exclusion of flow at any depth below the surfaces. This path to and from the apex is the path of least impedance for the current between electrodes, (C), (D), (E), (F). The second method involves the flow of currents along the V faces so that the current in each face is codirectional with that in the other face. Confining the codirectional currents to the faces is accomplished in two ways. Either a return conductor is placed above and equally spaced from the legs of the V, or a strip of magnetic material is placed along each V edge, (G). The first method has the advantage of the current being more on the V faces than in the second method. The disadvantage of the first method is that the faces of the V must be kept apart which is difficult if the edges are at all irregular, and that, often, the temperatures at the V apex are too high, (B), (G). Another disadvantage of the second method is the extra equipment that must be used to confine the currents to the V faces (G).

Applicant has found that he can have the advantages of both these methods without their disadvantages. In the present process, the edges of the V need not be as straight as required for the first method of the prior art, there are not excessive temperatures at the apex, and extra conductors or magnets are not needed to confine the currents to the faces to be welded, as in the second method of the prior art. Further, applicant with his process can weld strip edges to plates by the use of the V or by moving the edge of the strip parallel to the plane of the plate and into contact therewith. Also, applicant can weld edges together by moving them parallel to each other to effect contact therebetween. It is believed that the present process will do any welding that the prior H.F. heating processes would do, and that it will do some that they cannot do.

Having in mind the above and other defects of the prior art, and the advantages of the present process as set forth above, such advantages are among the objects of the present invention.

The principal object of the present invention is that of heating adjacent opposed surfaces by H.F. currents, where the proximity effect is achieved by the control, or regulation, of the phase relationship of such currents.

A further object of the present invention is that of heating opposed surfaces with codirectional H.F. currents and of confining such currents to such surfaces by means of the proximity effect; and further, of achieving such effect by the control, or regulation, of the phase relationship of such currents.

Another object of the present invention is that of the use of H.F.I. and phase regulation thereof in a plurality of conductors to be welded together so that such conductors may be simultaneously welded together; and it is a further object that such simultaneous welding may occur along a line common to all of such conductors or along a plurality of lines.

A further object of the present invention is the devising of a process of H.F.R. welding in which higher voltage heating power may be used than was possible in the practice of the prior art processes.

A specific object of the invention is the welding together of skelp edges to form pipe by the use of H.F.I. which are phase controlled to exhibit the proximity effect; and, to such use, the use of codirectional currents.

Another specific object is the welding together of the opposed edges of separate strips of material, similar or dissimilar materials, by the use of H.F.I. which are phase controlled to exhibit the proximity effect.

Another specific object is the welding together of the opposed edges of separate strips of material, similar or dissimilar materials, by the use of H.F.I. which are phase controlled to exhibit the proximity effect.

A further specific object is the welding of the edge of one piece of material to a surface of another by the use of H.F.I. which are phase controlled to exhibit the proximity effect.

Applicant achieves these desired results and objects and remedies the mentioned and other defects of the prior art by passing H.F. currents to the materials to be joined so as to achieve a skin effect, and of confining such currents to the faces to be heated by placing such faces in close opposition and in such orientation that the current at each face is codirectional with the current of the other face or faces, and of controlling the phase relationship of such currents so as to produce the phenomenon of the proximity effect in the currents so that they will be confined, or restricted, to such faces away from the other surfaces of such materials.

The broad process outlined above and specific applications thereof to achieve the above objects and others that will be apparent hereinafter, are described in detail herebelow and illustrated in the accompanying drawings in which:

FIGURE 1 is a schematic electrical circuit and perspective view of a setup for the progressive, or profluent, welding of a skelp.

FIGURE 2 is a schematic and perspective view of a setup for butt welding two pieces in which all of the opposed edge lengths are to be concurrently welded.

FIGURE 3 is a view of the pieces of FIGURE 2, with such pieces in welding position.

FIGURES 4 and 5 are schematic showings of other types of circuits that may be used in the practice of the invention.

FIGURE 6 is a plan view of three coplanar pieces of material ready for simultaneous and concurrent edge welding.

FIGURE 7 is a representation of the phasing of the H.F. currents in the pieces of FIGURE 6 so as to illustrate the phase relationship of such currents.

FIGURES 8 to 13, inclusive, are end views of various situations in which material edges are to be welded together by the processes of the present invention.

In each of the above views, broken arrows have been placed along side of the edges or material to be joined, or representation to indicate the phase relationship of the welding currents therein or there depicted. The angular relationship of the arrows in a view is the angular phase relationship of the currents, their phase angle, as in FIGURES 1, 2, 3, 4, 5, 8, and 13, or angles as in FIGURES 6, 7, 9, 10, 11, and 12.

The mechanical arrangement depicted in FIGURE 1 is in common use and is disclosed in the prior art and in the above cited patents. A pipe blank, or skelp, 11 has been formed to a cylindrical shape by means not shown, and is here shown being passed from left to right thru a welding station at which are located two pairs of pressure, or squeeze, rolls, 12, 13, 14, 15 that gradually bring together the spaced apart edges 17, 18 of the skelp to form a V at the apex 19 of which the welding together of the skelp edges takes place to form a pipe. The bearings and supporting frame for the pressure rolls have not been shown as such are well known in the art.

When H.F. currents are spoken of as codirectional, reference is had to the convention in the alternating current field of calling one output lead of a generator positive and another of its leads negative; and the currents in the respective leads as positive and negative currents; and of the currents in all positive leads as having the same direction of flow, or as being codirectional, and the same for currents in the negative leads.

The H.F.I. for heating the edges of the skelp is delivered thereto thru electrodes, or contacts, 21, 22, one adjacent each edge and opposite the other. These electrodes may be inserted in the V and slide on the edges 17, 18 or they may slide on the inner or the outer surfaces of the skelp adjacent the edges thereof as shown. These electrodes 21, 22 may both be considered to be positive and the power input electrodes for the purpose of illustration, with the power to one of the electrodes 180° out of phase to the other. A single negative output electrode 23 is the return electrode, or contact, and it contacts the pipe a short distance to the right of the apex 19 of the V. This is just to the right of the point at which the welding of the pipe takes place, and the newly formed weld line 24 continuously passes under the return electrode 23 as the skelp passes thru the preheating and welding zones. Contact 23 may have an open space to avoid touching hot weld 24. The preheating zone extends along the skelp edges between the input electrodes and the apex of the V, and the welding zone is at the apex of the V. A primary source of direct current power 26 is connected to a pair of high frequency generators 27, 28 having the same frequency output. The positive lead 29 of one of the generators 27 is connected to one, 21, of the electrodes and the positive lead 30 of the other generator 28 to the other electrode 22. Negative leads 31, 32 are connected between the negative electrode 23 and the H.F. generators 27, 28. A phase controller 33 is connected between and to the two H.F. generators 27, 28. The details of the construction of this controller are dependent on the construction of the H.F. generators and are no part of the present invention as such controllers, or phase shifters, are known in the electrical art. Power for the phase controller may be the same as for the H.F. generators or as needed.

The function of the controller is to set and maintain the phase angle between the currents of the generators 27, 28 to a predetermined value and frequency. This angle will be 180° for maximum surface heating while angles greater or less than that will increase the depth of the heating, measured normal to the edges. Further, the angle may be different than 180° for reasons set forth in connection with the description of FIGURE 9. The phase arrows 35, 36 are shown sensed 180° apart.

As in the prior art, the power used is a function of the type of materials being welded, their thickness, and, in the continuous seam welding of FIGURES 1, 4, and 5, the rate at which the skelp travels thru the welding zone. In the intermittent welding illustrated in FIGURES 2, 3, and 6, the length of the weld and the time allowed for heating are factors in the power used. In continuous welding, the spacing of the positive and negative electrodes is mostly a function of the speed of welding. The time that it takes to heat the to be welded surfaces is negligible as the current flows to a depth of only a few thousandths inch in magnetic materials.

In the prior art, as shown in FIGURE 1 of (G), it has been the practice to place the return electrode to the left ahead of the weld point 19 so as to prevent over heating thereat. In the present invention, this is not necessary as there is no tendency for the current from one input electrode 21 to short with the current from the other input electrode 22. Placing the output electrode 23 further to the right along the completed weld allows the welding currents to be used as normalizing heating currents, a result which it appears the prior art has not been able to achieve. The confining of the codirectional currents to the opposed edges solely by means of the use of the proximity effect results in an even heating of the edge faces from the inside to the outside of the about to be welded pipe or other materials. Further, this lack of tendency for the codirectional currents to short, and the absence of any adjacent conductive material for the currents to short to, means that currents having higher voltages than found in the prior art, may be used in the practice of the present invention. It is believed that the maximum voltage of the prior art was about 100 v. It is believed that the voltages used in the present invention may be of the order of several hundred. This is a distinct cost and operational advantage as it lightens the conductors and generating equipment, means less wear on electrodes, and better placement of the heating currents. It means a reduction in heat loss in conductors and electrodes, and less cooling of conductors and electrodes for a given power transfer.

The H.F. generators, their power source, and the leads, and the phase controller of FIGURE 2 may at the same as those disclosed for FIGURE 1, and have been given the same reference numerals. In FIGURE 2 there are shown two spaced apart strips of material 37, 38 in edge to edge relationship and ready for preheating by H.F.I. preliminary to welding. A positive lead 29, 30 from each generator 27, 28 is connected to a respective adjacent end of the strips, and a negative lead 31, 32 is similarly connected to each of the other ends of the strips so that current from the generators will be codirectional in the strips. The phase controller is adjusted so that the phase of the current in one strip 37 is and remains 180° from that in the other strip 38. This phase relationship is indicated by the broken line arrows 39, 40 being oppositely sensed. When the H.F. generators supply current to the strips, such current will flow practically entirely on the opposed edge faces 41, 42 of the strips 37, 38, due to the proximity effect achieved by the phase opposition of the currents.

When the opposed edges of the strips 37, 38 are at welding temperature, they are butted together with sufficient contact or pressure to effect a welding together of the strips as shown in FIGURE 3. The preheating time should be automatically controlled, and the strips butted at the termination of that time.

FIGURE 4 is a diagrammatic showing of another form of circuits that may be used for obtaining phase opposition or control of codirectional welding currents for use in the preheating of opposed material edges to be welded as a result of such heating. This circuit modification is shown applied to a skelp 11 having edges 17, 18 in the same condition and manner as in FIGURE 1. Also, the electrodes 21, 22, current flow, preheating, and resulting weld 24 are the same. The same power source 26 may be used to feed a H.F.I. generator 46 that for the same work capacity should have the combined output of the H.F. generators 27, 28 of FIGURE 1. The negative lead 47 from the generator is connected to the negative electrode 23 located to the right of the apex of the skelp V. The positive lead 48 is split with one branch 49 going directly to one, 21, of the positive electrodes, and the other branch 50 going to a phase shifter 51. The output lead 52 of the phase shifter is connected to the other 22 of the positive electrodes. The function of the phase shifter is to shift the phase of its output with respect to its input the desired angular amount, here indicated as 180°, altho, for the purpose of controlling the depth of heating, this angle may be different. The more the angle deviates from 180°, the less current will flow on the surface and the more will flow deeper in the material from the opposed edges thereof, due to a reduction in the proximity effect. The phase shifter 51 may comprise a suitable reactance or other phase shifting circuit.

FIGURE 5 is still another diagrammatic showing of a form of circuit that may be used for obtaining phase opposition of the codirectional welding currents applied as in FIGURES 1 and 4. In FIGURE 5, the output of the H.F. generator 46 is connected across the primary coil 54 of a H.F. welding head-transformer. The transformer secondary coil 55 is center tapped by a lead 56 to the negative electrode 23, and the coil ends are connected by leads 57, 58 to the positive electrodes 21, 22 which will be 180° out of phase because of the above described transformer connections.

FIGURES 6 to 13, inclusive, are further examples of types of welding operations that may be performed by means of the present invention. FIGURES 6, 9, 10, and 11 illustrate the concurrent joining together of a plurality of pieces. FIGURES 8 to 13, inclusive, are end views of pieces of material in position for preheating, and the relative phase angles between the codirectional currents is represented by the dotted arrows. Each arrow is placed alongside of the piece whose current phase angle it represents with respect to that of the associated piece or pieces.

FIGURE 6 is a plan view of three strips 61, 62, 63 ready for preheating. A negative lead 67 and a positive lead 68 is connected to each of the strips, and the H.F.I. to each of the strips may be provided by one of the methods outlined above. The phase relationship of the current in each piece to the other pieces is depicted by the phase arrow adjacent each of the opposed edges; and by a sinusoidal curve of FIGURE 7, which curve may be referred to by the primed number of the piece whose current it represents. It will be noted that the outside curves 61', 63' are in phase but that the center curve 62' is 180° out of phase with the outside curves. Thus, along the contiguous edges between the two upper pieces 61, 62 the codirectional currents are out of phase and the proximity effect will operate to confine current to these opposed edge faces. Similarly, the contiguous edges between the lower pieces 62, 63 have their currents out of phase and confined thereto. Very little, negligible, current will flow in the pieces or on their upper and lower faces. When the edge faces are heated to welding temperature, the pieces may be butted to effect a concurrent welding of the pieces. Of course, the amplitude and frequency of the curves 61', 62', 63' has been distorted in order that they may be pictured. Their phase relationship is the important feature to be shown, and it is believed that this has been done. Each of the sine curves of FIGURE 7 is only representative of current or field magnitude at a point as it varies as the sine of an independent variable such as time, which time, in this instance, shows the phase relationship of the current frequencies represented by the curves.

In the remaining figures, the currents in the illustrated pieces of material are codirectional and flow to and from the plane of the drawing, and the dotted phase arrows are not parallel to the current flow. Their relative positioning is only illustrative of the phase angle therebetween, with each arrow placed adjacent the piece whose current phase angle it represents.

FIGURE 8 represents the joining of the edge of one plate or strip 71 to the face of another plate or strip 72. The phase relationship of the currents will be 180° or close thereto depending on the desired depth of flow of current in the pieces. It makes no difference that one piece is being edge welded to the face of another. The current in the piece 72 having a face weld will be confined to the gap between the pieces 71, 72 by the proximity effect, and will not spread over the face of the face piece 72.

FIGURE 9 is a good illustration of a type of welding operation that it is believed would be impossible to perform with the prior art processes. In this example, three pieces 81, 82, 83 are arranged with the plane of each piece at an angle of 120° to the others and with one edge of each piece adjacent an edge of the others. The adjacent edges are shaped so that the faces thereof will butt. The welding current in each piece is 120° out of phase with the current in the other. With this arrangement of pieces and currents, with the adjacent edges properly spaced, the three currents will simultaneously heat the three edge faces preliminary to the concurrent welding thereof, which takes place when the edges are butted while maintaining the shown angular relationship. In the examples of FIGURES 6 to 13, inclusive, it is intended that the opposed edges, the edges to be welded, be parallel for the preheating step, and that they be moved together so as to butt along all of the opposed edges at the same time. Such an operation is an intermittent one. This is a distinction from the operation of FIGURES 1, 4, and 5 where the welding operation is continuous. For intermittent operation, it is desirable that the preheating time be automatically controlled as to length, and that the pieces be butted automatically at the end of the preheat. Also, for an intermittent welding operation, the power applied must be sufficient to heat the edges in a reasonable time so as to reduce the heat conduction from the edges. The ability to use higher voltages than was possible in the prior art is a distinct advantage where there are long edges to be welded in an intermittent operation.

FIGURE 10 may be considered to be an end view of FIGURE 6 and the description thereto applies here. The phase arrows of FIGURE 10 show the phase opposition desired, and they are representative of the sinusoidal curves of FIGURE 7.

FIGURE 11 illustrates how edges of two strips 101, 102 may be simultaneously welded to a single plate face 103. The currents in the strips are in phase, with the current in the plate being 180° out of phase with the strip currents.

FIGURE 12 shows the current phase in each flange 111, 112 of a channel for welding the edges thereof to the face 113 of a plate. There will be no current losses in the flanges and web of the channel or in the plate. All of the currents will be confined to the flanges' edge area and the opposed area of the plate face.

FIGURE 13 can be considered to be an end view of the pipe of FIGURE 1, and the phase relationship of the currents in that figure are as represented in FIGURE 12. Also, this figure can be representative of the welding of a short length of tubing where the edges 121, 122 are parallel and are to be preheated by currents phased as indicated by the dotted arrows adjacent thereto. Following the preheating, the edges will weld when squeezed together.

Still another modification of the invention will be explained by reference to FIGURE 1 and FIGURE 2 of the drawings. In this modification the phase controller 33 is omitted entirely and the phase control is obtained by regulating the phase relationship between generator 27 and generator 28. Both generator 27 and generator 28 are set to supply current at the same identical value and frequency. However, either generator 27 or generator 28 is provided with an arrangement which will be well understood by those skilled in the art to slightly speed up or slightly slow down one or the other of these generators so as to change the phase of the output from generator 27 with respect to the output from generator 28 so that the desired phase relationship is obtained, for example, a phase difference of 180°. This can be done, of course, by providing a slight mechanical resistance to generator 27 or generator 28 to make either one run at a speed slightly less than the speed of the other for a sufficient length of time to change the phase relationship to the desired value. Another means would be to provide an electrical arrangement whereby the current supplied to one of these generators is either slightly increased or slightly decreased to make the necessary or desired phase adjustment. Observation of the respective phases of the output from generator 27 as compared with the output from generator 28 can be made by viewing the respective outputs on an oscilloscope.

It will be understood that although the preferred phase relationship between the output from generator 27 and the output from generator 28 is a difference of 180° for the highest proximity effect to cause the current to travel at the least depth on the surfaces, some results in accordance with the invention will of course be obtained to some degree with a phase relationship having a difference greater than 0° and with an increase of proximity effect increasing to the maximum phase difference of 180°. The greatest depth of current in the surfaces will be obtained when the phase difference is 0°.

Having thus disclosed my invention, various forms of equipment for use in carrying out the processes of the invention, and various forms and applications of the invention, I claim:

1. The process of welding together material edges placed in close opposition, comprising: passing a high frequency current along each such edge so that such currents are parallel in direction and opposite in phase so as to heat the surfaces of such edges, and butting said edges to effect a weld of the materials of such edges.

2. The process of welding together material edges, comprising: placing material edges in close opposition, passing a high frequency current along each such edge so that such currents are parallel in direction and opposite in phase so as to heat the surfaces of such edges, and butting said edges to effect a weld of the materials thereof.

3. The process of welding together material edges, comprising: placing material edges in close opposition so that the opposed edges form the two legs and the apex of a V, passing a high frequency current along each such leg so that such currents are parallel in direction and opposite in phase so as to heat the surfaces of such legs, and continuously feeding such material edges to such legs and apex to continuously and progressively heat and butt such edges to effect a process of continuous welding together thereof.

4. The process of heating the edges of materials, comprising: placing three or more pieces of material so that such pieces have a radial and angular relationship about a common axis and with edges in parallel opposed proximity, applying a high frequency current to each such piece so that said currents' flow is codirectional and parallel to said axis, and controlling the phase of each such current so that such phases are in opposition along said axis.

5. In the method of continuously forming elongated sheet metal into tubing in which the sheet is moved longitudinally and continuously formed into a tube C-shaped in cross-section with longitudinal edges spaced from and facing one another, and at a stationary welding zone the edges are continuously pressed together forming a stationary elongated V gap between the moving edges, and the moving edges of the stationary V gap are heated to effect a weld at a welding point located at the apex of said V gap, the improvement for heating substantially only the surfaces of the moving edges within the stationary V gap to welding temperature and with an increase of concentration of heating on the surfaces of the moving edges toward the apex of said V gap, which comprises passing a high frequency current along each of said moving edges codirectionally of said V gap adjacent and in advance of said apex, the phase of the current in each of said edges being in opposition to the phase of the current in the other of said edges, and said high frequency current being of such radio frequency that the lowest impedance path therefor in the metal of the tube is provided along the edges within the gap and the resulting current flow and consequent resistance heating being concentrated at such edges and acting to continue to increase the temperature of said edges until the edges merge at the welding point and the current confines itself to flow substantially on the surfaces of the edges with a skin effect, and maintaining said V gap narrow so that the currents on the opposing edges flow close to one another and closer toward the apex whereby the interaction of said currents flowing along opposite edges of said narrow V gap on one another causes the currents to flow further toward the surfaces of the edges and thereby heat substantially only the surfaces of the edges just prior to welding contact at the apex.

6. The process of claim 5 in which the said phase opposition is that of about a 180° phase difference.

7. The process of welding together material edges placed in close opposition, comprising: passing a high frequency current along each such edge so that such currents are parallel and codirectional, opposite in phase, and with the frequency of said currents sufficiently high to produce skin effect, and closely spacing said edges; so that due to the skin effect resulting from the high frequency, due to their phase relationship, and due to the spacing of said edges, said currents will flow along said edges and exhibit a proximity effect, and said currents will thereby concentrate in and will heat said edges; and immediately after such heating butting said edges to effect a weld of the materials of said edges.

8. The process of claim 7 in which the said opposite phase relationship is that of about a 180° phase difference.

9. The process of welding together material edges placed in close opposition, comprising: passing a high frequency current along and adjacent each such edge so that such currents are parallel and codirectional, opposite in phase, with the frequency of said currents sufficiently high to produce skin effect, and closely spacing said currents; so that due to the skin effect resulting from the high frequency, due to their phase relationship, and due to the spacing of said currents, a said current will flow along each such edge and said currents will exhibit a proximity effect, and said currents will thereby concentrate in and will heat said edges; and immediately after such heating butting said edges to effect a weld of the materials of said edges.

10. The process of claim 9 in which the said phase relationship is that of about a 180° phase difference.

11. The process of welding together material edges placed in close opposition, comprising: causing high frequency currents to flow parallel and codirectional with respect to said edges and opposite in phase so as to heat such edges, and upon said heating butting said edges to effect a weld of the materials of such edges.

12. The process of heating a piece of material comprising: passing high frequency currents along and adjacent such material so such currents are parallel and co-directional, opposite in phase, with the frequency of such currents sufficiently high to produce skin effect, and closely spacing said currents; so that due to the skin effect resulting from the high frequency, due to their phase relationship, and due to the spacing of said currents, said currents will exhibit a proximity effect, and a said current will concentrate in and heat such material surface.

13. The process of claim 12 in which said phase relationship is that of about a 180° phase difference.

14. The process of claim 12 in which the depth of such heating from the surface of such material varies as a function of said phase relationship.

15. The process of claim 12 in which the depth from its surface to which such material is heated is controlled by the variation of the said phase relationship from a difference of 180°.

16. The process of heating the edges of pieces of materials, comprising: placing such edges in opposed proximity, causing high frequency currents to flow parallel and co-directional with respect to said edges, having such currents opposite in phase with the frequency of such sufficiently high to produce skin effect, and closely spacing said currents; so that due to the skin effect resulting from their high frequency, due to their phase relationship, and due to the spacing of said currents, said currents will exhibit a proximity effect, and due to the relationship of said currents to said edges said currents will heat said edges.

17. The process of claim 16 in which the said phase relationship is that of about a 180° phase difference.

18. The process of claim 16 in which each of said edges has flowing therein one of said currents.

19. The process of claim 18 in which the said phase relationship is that of about a 180° phase difference.

20. The process of heating edges of pieces of materials, comprising: placing such edges in opposed proximity, causing a first high frequency current to flow along one of said edges, causing a second high frequency current to flow parallel and codirectional and opposite in phase with respect to said first current, whereby said currents heat said edge.

21. The process of welding together pieces of material, comprising: placing such pieces of material so that each piece has a portion thereof in close opposition to a portion of another piece, passing a high frequency current to each of said pieces and to said portions so that such currents are parallel and codirectional, opposed in phase, and with the frequency of said currents sufficiently high to produce skin effect; so that due to the skin effect resulting from the high frequency, due to their phase relationship, and due to the spacing of said portions, a said current will flow adjacent the surface of each such portion and said currents will exhibit a proximity effect, and said currents will thereby concentrate in and adjacent said portions and will heat said portions; and immediately upon such heating bringing said portions together to effect a welding of said portions and pieces of material.

22. The process of claim 21 in which the said phase relationship is that of about a 180° phase difference.

References Cited in the file of this patent

UNITED STATES PATENTS

| 2,034,411 | Mitchell | Mar. 17, 1936 |
| 2,066,668 | Bennett | Jan. 5, 1937 |
| 2,692,322 | Bennett | Oct. 19, 1954 |
| 2,818,488 | Rudd | Dec. 31, 1957 |
| 2,821,619 | Rudd | Jan. 28, 1958 |
| 2,827,543 | Rudd | Mar. 18, 1958 |
| 2,827,544 | Cable | Mar. 18, 1958 |
| 2,857,503 | Rudd | Oct. 21, 1958 |

OTHER REFERENCES

"High-Frequency Resistance Welding," by Wallace Rudd, The Welding Journal, July 1957; pub., American Welding Society, 33 W. 39th Street, New York 18, N.Y.